US012797987B2

(12) United States Patent
Konishi et al.

(10) Patent No.: US 12,797,987 B2
(45) Date of Patent: Nov. 17, 2026

(54) ARC WELDED JOINT AND ARC WELDING METHOD

(71) Applicant: JFE STEEL CORPORATION, Tokyo (JP)

(72) Inventors: Kyohei Konishi, Tokyo (JP); Hiroshi Matsuda, Tokyo (JP); Koichi Taniguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 610 days.

(21) Appl. No.: 18/287,320

(22) PCT Filed: Apr. 26, 2022

(86) PCT No.: PCT/JP2022/018951
§ 371 (c)(1),
(2) Date: Oct. 18, 2023

(87) PCT Pub. No.: WO2022/230905
PCT Pub. Date: Nov. 3, 2022

(65) Prior Publication Data

US 2024/0198443 A1 Jun. 20, 2024

(30) Foreign Application Priority Data

Apr. 28, 2021 (JP) ................................ 2021-076656

(51) Int. Cl.
*B23K 9/02* (2006.01)
*B23K 9/025* (2006.01)
(Continued)

(52) U.S. Cl.
CPC ................ *B23K 9/025* (2013.01); *F16B 5/08* (2013.01)

(58) Field of Classification Search
CPC ............ B23K 2101/18; B23K 2103/04; B23K 35/0261; B23K 35/3073; B23K 35/383;
(Continued)

(56) References Cited

U.S. PATENT DOCUMENTS 9,616,528 B2 * 4/2017 Izutani .................. B23K 9/025
2008/0142490 A1 6/2008 Suzuki et al.
(Continued)

FOREIGN PATENT DOCUMENTS

EP 3 808 488 A1 4/2021
JP H07-197204 A 8/1995
(Continued)

OTHER PUBLICATIONS

Jan. 28, 2026 Office Action issued in Korean Patent Application No. 10-2023-7035562. [English-language Concise Statement of Relevance attached hereto.].
(Continued)

*Primary Examiner* — Quang T Van
(74) *Attorney, Agent, or Firm* — Oliff PLC

(57) ABSTRACT

An arc welded joint and an arc welding method. The arc welded joint has a weld formed by arc welding of an overlap of at least two steel sheets. The throat in the weld and the sheet that is uppermost among the steel sheets satisfy a specified relationship. In a region extending 2.0 mm from a bead toe of the weld in a weld metal direction and also extending 2.0 mm from the bead toe in a base material direction, a slag-covered area ratio is 50% or less.

18 Claims, 5 Drawing Sheets

(51) Int. Cl.
*B23K 9/09* (2006.01)
*F16B 5/08* (2006.01)

(58) Field of Classification Search
CPC .......... B23K 9/025; B23K 9/173; B23K 9/23; B23K 9/073; B23K 9/295; F16B 5/08
USPC .......... 219/54, 74, 130.51, 123, 137.71, 129
See application file for complete search history.

(56) References Cited

U.S. PATENT DOCUMENTS

| | | | | |
|---|---|---|---|---|
| 2014/0202993 | A1 * | 7/2014 | Kawamoto | B23K 9/073 219/130.51 |
| 2015/0027995 | A1 | 1/2015 | Izutani et al. | |

FOREIGN PATENT DOCUMENTS

| | | | | |
|---|---|---|---|---|
| JP | H08-309533 | A | | 11/1996 |
| JP | 2005103622 | A | * | 4/2005 |
| JP | 2006150439 | A | | 6/2006 |
| JP | 3905876 | B2 | | 4/2007 |
| JP | 2009262197 | A | | 11/2009 |
| JP | 2012213801 | A | | 11/2012 |
| JP | 2012213803 | A | | 11/2012 |
| JP | 2013-184216 | A | | 9/2013 |
| JP | 2013220431 | A | | 10/2013 |
| JP | 2020-528006 | A | | 9/2020 |
| KR | 10-2016-0077325 | A | | 7/2016 |
| KR | 10-2018-0116177 | A | | 10/2018 |
| WO | 2013/132550 | A1 | | 9/2013 |
| WO | 2018/159404 | A1 | | 9/2018 |

OTHER PUBLICATIONS

May 16, 2023 Office Action issued in Japanese Patent Application No. 2022-542020.

Dec. 6, 2024 Extended Search Report issued in European Patent Application No. 22795818.8.

Jan. 11, 2026 Office Action issued in Chinese Patent Application No. 202280029308.1 with concise statement of relevance.

Jun. 21, 2022 International Search Report issued in International Application No. PCT/JP2022/018951.

* cited by examiner (A)

(B)

ARC WELDED JOINT AND ARC WELDING METHOD

TECHNICAL FIELD

This application relates to an arc welded joint having excellent joint strength and suited for, for example, an automobile member, and to an arc welding method for obtaining such the arc welded joint.

BACKGROUND

In recent years, automobiles are increasingly required to satisfy high strength and high rigidity of various members used in automobiles in order to enhance the safety and the reliability of automobile bodies, and to concurrently satisfy light weightiness of members with the aim of improving fuel efficiency. To meet such a need, members are made of thinner steel sheets through the use of high strength steel sheets.

To produce welded joints, a lap fillet arc welding method is widely used in which two steel sheets are overlapped and fillet arc welded together. Various members that are used in automobiles are subjected to environments with repeated loads and thus require fatigue strength. At the same time, sufficient static strength is also important from the point of view of crash safety. In particular, members used in a corrosive environment encounter difficulties in maintaining the strength of the members because corroded regions expand with time and also because the corrosion proceeds in the thickness direction to reduce the thickness of the welds in the welded joints and the vicinities of the welds.

For example, Patent Literature 1 discloses an arc welded lap joint structure with improved fracture mode. In this arc welded lap joint, the weld metal has strength higher than or equal to the strength of the base material made of a high-strength material, and, when the structure is subjected to an excessive load, fracture occurs at the base material, not at the weld metal. This technique improves the fracture mode by specifying the leg length and the theoretical throat of the lap joint, and also by limiting the tensile strength (TS) of the steel sheets to 640 MPa or more and specifying the Ceq and the hardness of the steel sheets and the weld metal.

CITATION LIST

Patent Literature

PTL 1: Japanese Patent No. 3905876

SUMMARY

Technical Problem

However, the technique disclosed in Patent Literature 1 entails the use of a steel sheet having a tensile strength of 640 MPa or more, and is not shown to be effective for a steel sheet having a tensile strength of less than 640 MPa that is applied to automobile chassis. Furthermore, the welded joints of interest in Patent Literature 1 are those free from corrosion, and no consideration is made as to whether the desired joint characteristics are obtained in a corrosive environment that causes a decrease in joint strength.

The disclosed embodiments have been made in view of the problems discussed above. It is therefore an object to provide an arc welded joint that can prevent rusting at the weld and has excellent joint strength even in a progressively corrosive environment, and an arc welding method for obtaining such an arc welded joint.

Solution to Problem

In order to solve the problems described above, the inventors have carried out extensive studies on a technique that suppresses rusting in a weld of steel members and enhances the joint strength of the weld even in a progressively corrosive environment.

The inventors have specified the throat in accordance with the thickness of a base material steel sheet and have found that an allowable stress in the weld can be thereby ensured, and sufficient joint strength can be obtained even when a tensile load is applied in a direction perpendicular to the weld line. Furthermore, the inventors have assumed that rusting at the weld can be suppressed and the decrease in joint strength stemming from corrosion can be reduced by reducing the amount of slags attached to the weld, especially a weld toe.

The disclosed embodiments have been completed through further studies based on the above findings. A summary of the disclosed embodiments is as follows.

[1] An arc welded joint having a weld formed by arc welding of an overlap of at least two steel sheets, wherein the throat in the weld and the sheet that is uppermost among the steel sheets satisfy the relationship $0.5\times t\leq a\leq 1.8\times t$ wherein a is the throat (mm) and t is the thickness (mm) of the uppermost sheet, and in a region extending 2.0 mm from a bead toe of the weld in a weld metal direction and also extending 2.0 mm from the bead toe in a base material direction, the slag-covered area ratio $S_{RATIO}$ (%) calculated by the formula (1) is 50% or less wherein $S_{TOE}$ is the bead toe surface area ($mm^2$) that is the surface area of a weld bead in the region, and $S_{SLAG}$ is the slag surface area ($mm^2$) that is part of the bead toe surface area $S_{TOE}$ and represents the area of a region covered with a slag, $$S_{RATIO}=100\times S_{SLAG}/S_{TOE} \quad (1).$$

[2] The arc welded joint described in [1], wherein the throat in the weld excluding bead-start and bead-finish end portions of the weld bead has a maximum value and a minimum value satisfying the relationship $a_{max}/a_{min}\leq 1.5$ wherein $a_{max}$ is the maximum value (mm) of the throat and $a_{min}$ is the minimum value (mm) of the throat.

[3] An arc welding method for obtaining an arc welded joint described in [1] or [2], including:

forming a weld by arc welding of an overlap of at least two steel sheets while using a shielding gas including Ar gas and an oxidizing gas, the oxidizing gas satisfying the relationship of the formula (2):

$$2\times[O_2]+[CO_2]\leq 5 \quad (2)$$

wherein $[O_2]$ is the vol % of $O_2$ in the shielding gas, and $[CO_2]$ is the vol % of $CO_2$ in the shielding gas.

[4] The arc welding method described in [3], wherein the arc welding is performed at a welding speed and a wire feed speed satisfying the relationship $5\leq v_w/v_t\leq 35$ wherein $v_t$ is the welding speed (cm/min) and $v_w$ is the wire feed speed (cm/min).

[5] The arc welding method described in [3] or [4], wherein the steel sheets and a welding wire are intermittently short-circuited during the arc welding, and the average short-circuit frequency $F_{AVE}$ (Hz) during the short-circuit is 20 to 300 Hz and the maximum short-circuit cycle $T_{CYC}$ (s) during the short-circuit is 1.5 s or less. [6] The arc welding method described in any one of [3] to [5], wherein the arc welding uses a pulse current as a welding current, and the value of X (A·s/m) calculated by the formula (3) satisfies 50≤X≤250 wherein $I_{PEAK}$ is the peak current (A) of the pulse current, $I_{BASE}$ is the base current (A), $t_{PEAK}$ is the peak time (ms), $t_{up}$ is the rise time (ms), $t_{DOWN}$ is the fall time (ms), and L is the distance (mm) between the steel sheets and a contact tip, $$X=(I_{PEAK}\times t_{PEAK}/L)+(I_{PEAK}+I_{BASE})\times(t_{UP}+t_{DOWN})/(2\times L) \quad (3).$$

[7] The arc welding method described in any one of [3] to [6], wherein the arc welding uses a solid wire as a welding wire.

Advantageous Effects

According to the disclosed embodiments, an allowable stress in the weld is ensured by specifying the throat in accordance with the thickness of the base material steel sheet, and rusting is suppressed by reducing the coating weight of slags attached to the weld. Thus, an arc welded joint can be obtained that exhibits excellent joint strength stably even in a progressively corrosive environment. Furthermore, the arc welding method provided according to the disclosed embodiments can produce such welded joints.

DETAILED DESCRIPTION

An arc welded joint and an arc welding method of the disclosed embodiments will be described with reference to FIGS. 1 to 7. Here, lap fillet welding is described as an exemplary embodiment of the application of the disclosed embodiments. However, the disclosed embodiments are not intended to be limited to lap fillet welding and may be applied to various welding techniques (such as, for example, butt welding).

Figure 1:
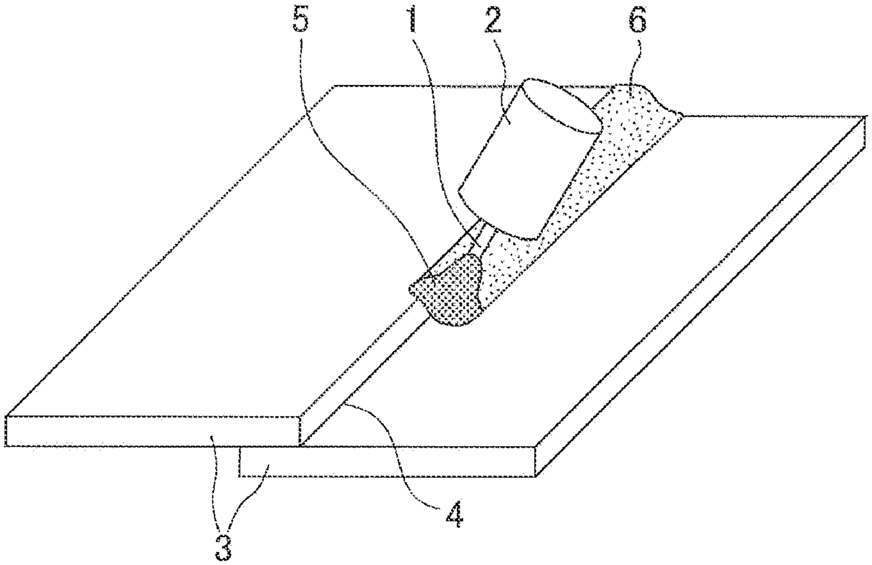
FIG. 1 is a perspective view schematically illustrating an example in which an embodiment is applied to lap fillet welding.
Figure 2:
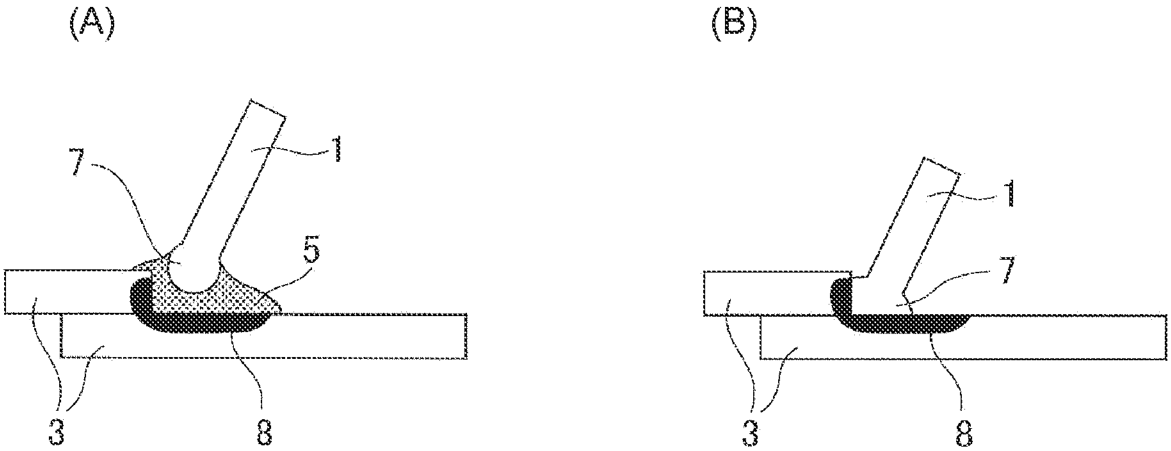
FIG. 2(A) and FIG. 2(B) are enlarged schematic sectional views of a welding wire and the periphery thereof in FIG. 1, illustrating how a short-circuit transfer occurs.
Figure 3:
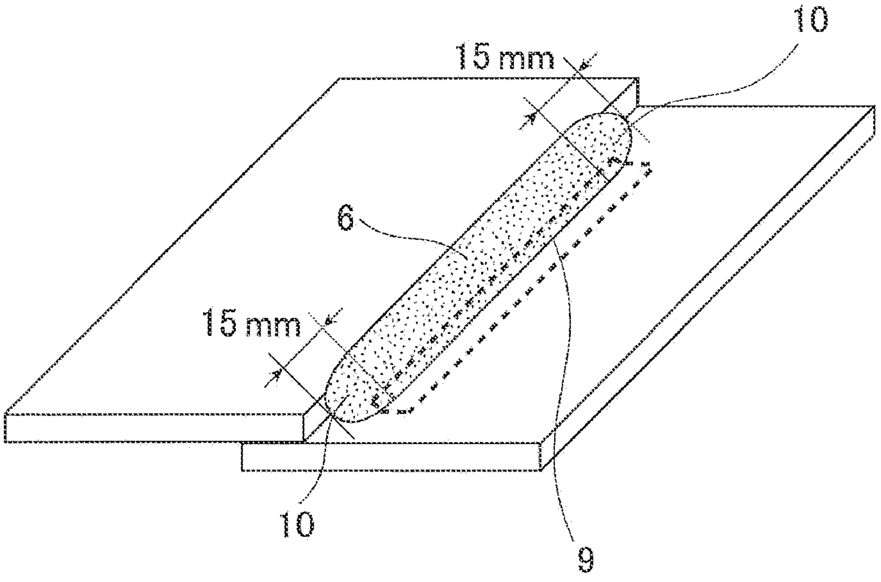
FIG. 3 is a perspective view schematically illustrating a weld bead toe of a weld bead formed by lap fillet welding illustrated in FIG. 1, and start-end and finish-end portions of the weld bead.

First, a technical concept of the disclosed embodiments will be described with reference to FIG. 1 to FIG. 3. FIG. 1 to FIG. 3 illustrate an example of lap fillet welding of two steel sheets by arc welding. When an overlap of two steel sheets is arc welded as is the case in the example illustrated in FIG. 1 to FIG. 3, the upper steel sheet is the uppermost sheet, and the lower steel sheet is the lower sheet. When three or more steel sheets are overlapped, the uppermost sheet is the steel sheet placed in the highest position.

For example, as illustrated in FIG. 1, the electrodes in the disclosed embodiments are steel sheets 3, and a welding wire 1 that is continuously fed from a welding torch 2 to the steel sheets 3 through a central portion of the welding torch 2, and a welding voltage is applied from a welding power source (not shown). Specifically, the phrase "from a welding torch 2 to the steel sheets 3" means "from a welding torch 2 to a weld line defined by a corner 4 of a step formed by the overlapping of the two steel sheets 3 that are the base material". Part of a shielding gas (not shown) supplied from the inside of the welding torch 2 is ionized into plasma, thereby forming an arc 5 between the welding wire 1 and the steel sheets 3. Part of the shielding gas that is not ionized and flows from the welding torch 2 to the steel sheets 3 plays a role of shielding the arc 5 and a molten pool (not shown in FIG. 1) formed by melting of the steel sheets 3 from the outside air. The thermal energy of the arc 5 melts the tip of the welding wire 1 to form droplets, and the droplets are transported to the molten pool by, for example, electromagnetic force or gravity. This phenomenon occurs continuously while the welding torch 2 or the steel sheets 3 are moved. As a result, the molten pool behind the process along the weld line solidifies to form a weld bead 6. In this manner, the two steel sheets are joined together.

If the arc welded joint formed as described above has a low ratio of the throat to the thickness of the uppermost sheet (throat to uppermost sheet thickness ratio), the amount of deposits from the welding wire is insufficient and the sectional area of the throat is small. Thus, the weld is subjected to high stress. If, on the other hand, the ratio is too high, the amount of deposits from the welding wire is excessively large and the weld bead is convex. Thus, the stress concentration at the weld toe is increased.

Figure 5:
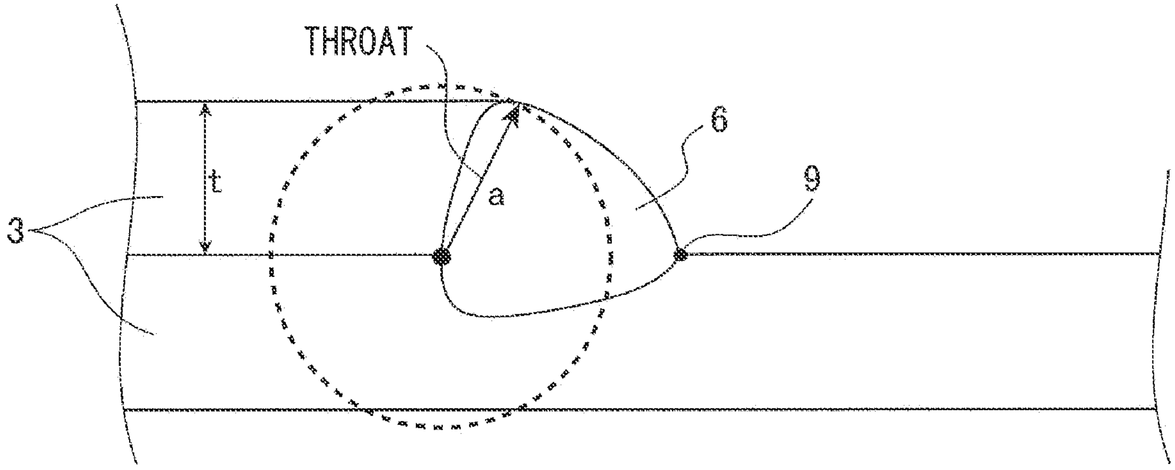
FIG. 5 is a sectional view of the arc welded joint in FIG. 4(A) taken along the line A-A and schematically illustrates a weld bead toe and the periphery thereof.

In order to solve these problems, the disclosed embodiments focus on and specify the throat in accordance with the thickness of the base material steel sheet that is the uppermost sheet (see FIG. 5). Specifically, the focus is drawn to the finding that the stress concentration in the weld can be relaxed by the satisfaction of the relationship 0.5×t≤a≤1.8×t wherein a is the throat (n) and t is the thickness (mm) of the base material steel sheet that is the uppermost sheet.

In the disclosed embodiments, it has been found that an arc welded joint having a throat specified in accordance with the sheet thickness benefits from the relaxation of stress concentration at the weld metal and consequently exhibits sufficient joint strength even when a tensile load is applied in a direction perpendicular to the weld line.

Furthermore, it has been found that the throat can be effectively controlled in accordance with the sheet thickness through controlling of the amount of deposits from the welding wire per unit length in the welding process. The disclosed embodiments thus focus on the relationship between the welding speed and the wire feed speed as described later.

Furthermore, as described hereinabove, the disclosed embodiments focus on the suppression of rusting at the weld, especially the weld toe, in order to ensure enhanced joint strength even in a corrosive environment.

When two steel sheets 3 are overlapped and are lap fillet welded by arc welding as illustrated in FIG. 1, $O_2$ or $CO_2$ mixed in the shielding gas is heated by the arc 5, and the reaction shown in the formula (6) or the formula (7) proceeds:

$$O_2 \rightarrow 2[O] \qquad (6)$$

$$CO_2 \rightarrow CO+[O] \qquad (7)$$

The oxygen generated by the above decomposition reaction dissolves into the molten metal 7 and the molten pool 8 (see FIG. 2(A) and FIG. 2(B)) and remains as bubbles in the weld metal when the melt is cooled and solidifies as the weld metal. Furthermore, the oxidation reaction of iron with oxygen may proceed to deteriorate the mechanical performance of the weld metal.

In order to solve these problems, the welding wire 1 and the steel sheets to which non-ferrous elements, such as Si, Mn, and Ti, are added as deoxidizing agents are used. That is, the reaction between oxygen and iron is suppressed by discharging the oxygen generated by the reaction of the formula (6) or the formula (7) as slags, such as $SiO_2$, MnO, and $TiO_2$.

In the subsequent cooling process, however, the slags discharged to the surface of the molten pool 8 aggregate and solidify while attaching to the surface and the bead toe 9 of the weld bead 6 (see FIG. 3). In such an arc welded joint that bears slags on the bead toe 9, the slag regions are insulators. Thus, even when the steel is subjected to chemical conversion (such as, for example, zinc phosphate treatment), the slag regions are not coated with a chemical conversion layer made of zinc phosphate crystals. The regions exposed from the chemical conversion layer do not allow for sufficient formation of coating films even when treated by electrodeposition coating, or do not allow the coating films to exhibit sufficient adhesion thereto. Thus, corrosion resistance is significantly lowered. As a result, the thickness is lost due to the occurrence of rusting and the progress of corrosion. It is therefore necessary that slag formation be suppressed while avoiding deterioration of the mechanical performance of the weld metal through the addition of deoxidizing agents to the welding wire 1 and the steel sheets 3.

Specifically, the above slag-forming reaction (the oxidation reaction) is suppressed without reducing the amounts of additive elements added to ensure the mechanical performance of the weld metal. For this purpose, the oxidizing gas contained in the shielding gas is specified. The suppression of the slag-forming reaction reduces the occurrence of coating failures in the electrodeposition coating process, thus leading to enhanced corrosion resistance. Consequently, the occurrence of rusting and the progress of corrosion can be prevented even in a corrosive environment.

Specifically, as described above, the disclosed embodiments specify the oxidizing gas contained in the shielding gas so that the amount of $O_2$ or $CO_2$ that is mixed is small, and thereby suppresses the formation of slags that are attached to the weld, especially the weld toe. In this manner, it has been found that rusting can be suppressed, and the decrease in joint strength due to corrosion can be reduced.

Here, the bead toe 9 and the bead-start and bead-finish end portions 10 of the weld bead 6 will be described with reference to FIG. 3. As illustrated in FIG. 3, the "bead-start and bead-finish end portions" in the disclosed embodiments indicate regions that include a bead-start end portion and a bead-finish end portion at the respective terminals. The "bead-start end portion" is a region extending 15 mm from the bead-start end (the welding start position) toward the bead-finish end (the welding finish position) on the weld line, and the "bead-finish end portion" is a region extending 15 mm from the bead-finish end toward the bead-start end on the weld line. In the disclosed embodiments, the "bead toe" indicates a boundary between the weld metal and the unmelted steel sheet that is the base material, located in a direction perpendicular to the weld line of the weld bead. The "weld line" indicates a line parallel to the welding direction in which the weld bead 6 is formed.

Figure 4:
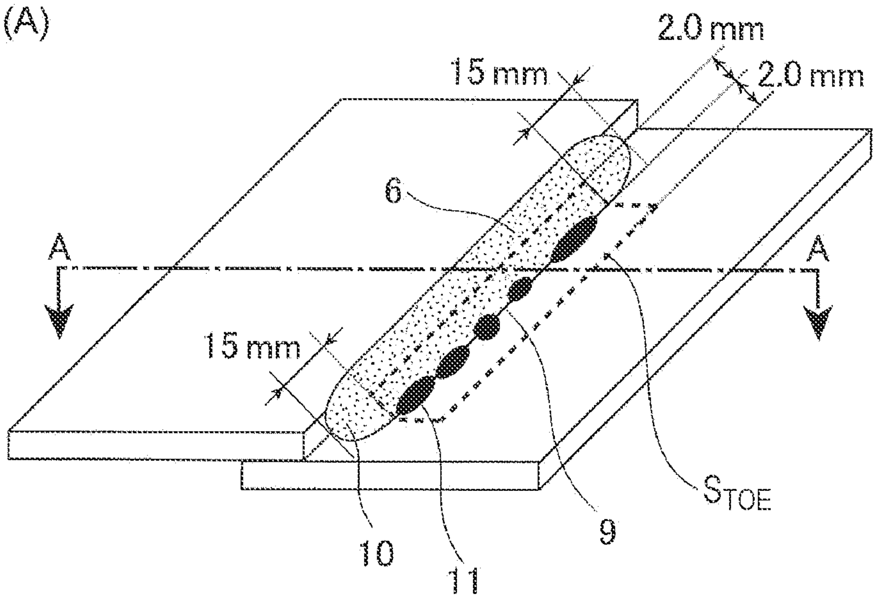
FIG. 4(A) and FIG. 4(B) are views schematically illustrating a weld in an arc welded joint according to an embodiment.
Figure 4:
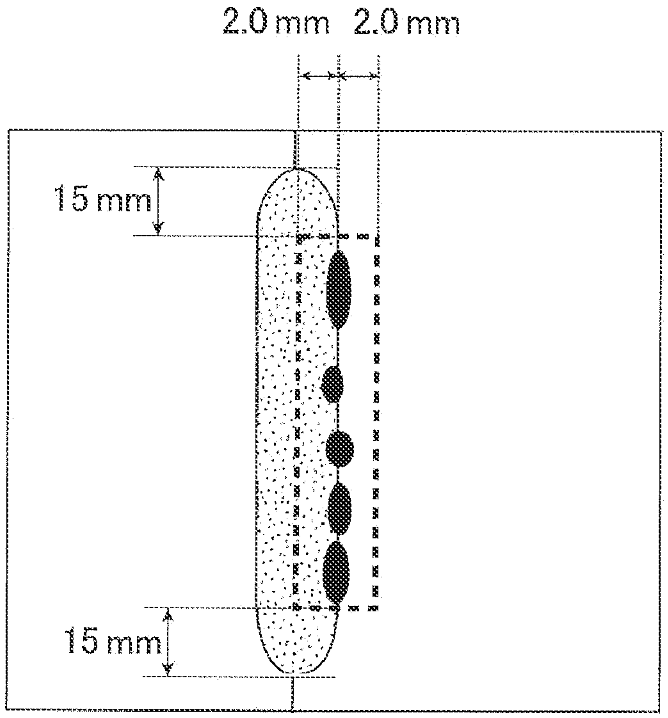

Next, the arc welded joint of the disclosed embodiments will be described with reference to FIG. 4 and FIG. 5. FIG. 4(A) illustrates a perspective view of a weld bead 6 in an arc welded joint formed by lap fillet welding of FIG. 1. FIG. 4(B) illustrates a plan view of the arc welded joint. FIG. 5 illustrates an enlarged front view of part of the A-A line cross section of the arc welded joint illustrated in FIG. 4(A).

As described hereinabove, the arc welded joint of the disclosed embodiments is an arc welded joint formed by arc welding of an overlap of at least two steel sheets. In the arc welded joint, the throat in the weld and the sheet that is uppermost among the steel sheets satisfy the relationship $0.5\times t \leq a \leq 1.8\times t$ wherein a is the throat (mm) and t is the thickness (mm) of the uppermost sheet, and, in a region extending 2.0 mm from a bead toe of the weld in a weld metal direction and also extending 2.0 mm from the bead toe in a base material direction, the slag-covered area ratio $S_{RATIO}$ (%) calculated by the formula (1) is 50% or less wherein $S_{TOE}$ is the bead toe surface area ($mm^2$) that is the surface area of a weld bead in the region, and $S_{SLAG}$ is the slag surface area ($mm^2$) that is part of the bead toe surface area $S_{TOE}$ and represents the area of a region covered with a slag, $$S_{RATIO}=100\times S_{SLAG}/S_{TOE} \qquad (1).$$

Relationship between the throat a in the weld and the thickness t of the uppermost sheet: $0.5\times t \leq a \leq 1.8\times t$ FIG. 5 illustrates a schematic view of a bead toe 9 and the periphery thereof. The distance a (mm) illustrated in FIG. 5 is the throat, and t (mm) is the thickness of the uppermost sheet. If the throat a (mm) is less than (0.5×t) (mm), the amount of deposits from the welding wire is insufficient and the sectional area of the throat is small. Thus, the weld is subjected to high stress. Thus, the throat a (mm) in the disclosed embodiments is limited to (0.5×t) (mm) or more. The throat a (mm) is preferably (0.6×t) (mm) or more, more preferably (0.65×t) (mm) or more, and still more preferably (0.95×t) (mm) or more. If, on the other hand, the throat a (mm) is larger than (1.8×t) (mm), the amount of deposits from the welding wire is excessively large and the weld bead is convex. Thus, the stress concentration at the bead toe 9 is increased. Thus, the throat a (mm) in the disclosed embodiments is limited to (1.8×t) (mm) or less. The throat a (mm) is preferably (1.6×t) (mm) or less, and more preferably (1.5×t) (mm) or less.

The "throat a" described above may be measured in the following manner, as described later in EXAMPLES. Specifically, the throat is measured in a region of the weld bead 6 excluding the bead-start and bead-finish end portions 10 (each 15 mm in length), with respect to randomly selected eight through-thickness cross sections of the weld bead 6 perpendicular to the weld line. As illustrated in FIG. 5, the weld bead 6 is cut at randomly selected eight locations in the thickness direction perpendicular to the weld line, and the cross sections are subjected to Nital etching. Subsequently, the cross sections are photographed with an optical microscope (magnification: 10×) to determine the throat at the respective locations. The results are averaged to give the "throat a (mm)". In the example illustrated in FIG. 5, the throat is the shortest distance from the boundary between the lower side of the uppermost steel sheet 3 and the weld metal 6, to the surface of the weld metal. The dotted circle illustrated in FIG. 5 indicates the range of the shortest distance. The "lower side" described above indicates the side of the uppermost steel sheet 3 onto which the lower sheet is overlapped.

Slag-Covered Area Ratio $S_{RATIO}$ (%): 50% or Less

Referring to FIG. 4, the slag-covered area ratio $S_{RATIO}$ (%) calculated by the formula (1) is 50% or less wherein $S_{TOE}$ is the bead toe surface area (mm$^2$) that is the surface area of a predetermined region of the weld including the bead toe 9, and $S_{SLAG}$ is the slag surface area (mm$^2$) that is part of the bead toe surface area $S_{TOE}$ and represents the area of regions covered with slags 11. If the slags 11 that have been formed during the welding process attach to the surface of the weld bead 6 so as to increase the slag-covered area ratio to more than 50%, a chemical conversion layer is not formed sufficiently even when the arc welded joint is subjected to chemical conversion, and electrodeposition coating fails to form a coating film or results in a coating film having poor adhesion. Thus, rusting and thickness loss occur easily in a corrosive environment, and as a result, the joint strength may be lowered. Reducing the amount of slag formation leads to less aggregation of the slags 11 on the surface of the weld bead 6, and thereby enhances chemical convertibility and electrodeposition coatability, thus suppressing the decrease in joint strength due to corrosion. Thus, the slag-covered area ratio $S_{RATIO}$ is preferably 45% or less, and more preferably 40% or less.

As illustrated in FIG. 4(A) and FIG. 4(B), the "bead toe surface area $S_{TOE}$" indicates the surface area of the weld bead 6 in a region extending 2.0 mm from the bead toe 9 of the weld in a weld metal direction perpendicular to the weld line and also extending 2.0 mm from the bead toe 9 in a base material direction perpendicular to the weld line. That is, in the example illustrated in FIG. 4(A) and FIG. 4(B), the bead toe surface area is the surface area of the weld bead 6 in the 4.0 mm region having the bead toe 9 at the center. Furthermore, as illustrated in FIG. 4(A) and FIG. 4(B), the "slag surface area $S_{SLAG}$", which is part of the bead toe surface area $S_{TOE}$, indicates the total of the areas of regions covered with the slags 11 in the same region as the bead toe surface area $S_{TOE}$ is measured (in the example illustrated in FIG. 4, the 4.0 mm region having the bead toe 9 at the center). The bead toe surface area $S_{TOE}$ and the slag surface area $S_{SLAG}$, may be determined by the method described later in EXAMPLES.

The smaller the amount of non-conductive slags that are formed, the higher the chemical convertibility and the electrodeposition coatability. Thus, a smaller slag-covered area ratio $S_{RATIO}$ is more preferable with no limitation of the lower limit. The slag-covered area ratio $S_{RATIO}$ is preferably 0.1% or more, more preferably 0.5% or more, and still more preferably 1.0% or more.

Figure 7:
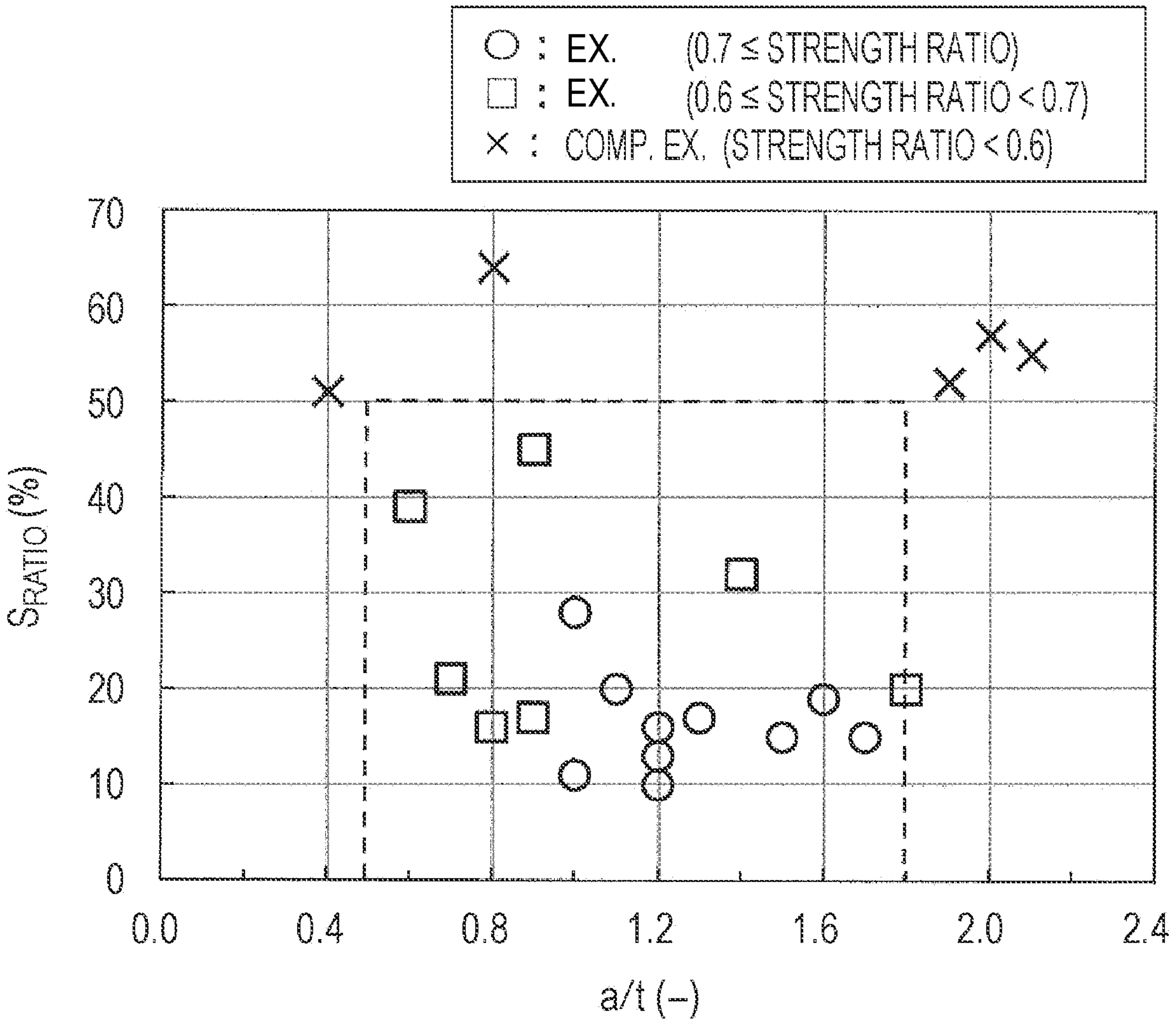
FIG. 7 is a graph illustrating relationships between the throat and the slag-covered area ratio of a weld, and the ratio of the joint tensile strength to the base material tensile strength.

The throat a and the slag-covered area ratio $S_{RATIO}$ in the weld are controlled to the ranges described above, and thereby the advantageous effects described hereinabove can be obtained. The graph in FIG. 7 illustrates relationships between the throat and the slag-covered area ratio, and the ratio (i.e., strength ratio) of the joint tensile strength to the base material tensile strength. While details will be described later, as illustrated in FIG. 7, the slag-covered area ratio can be reduced and the joint strength can be enhanced by appropriately controlling the throat and reducing the amount of an oxidizing gas contained in the shielding gas.

In order to relax the stress concentration upon tensile load application in a direction perpendicular to the weld line more effectively, the above configuration is desirably combined with stabilization of the shape of the weld bead 6. Specifically, in the disclosed embodiments, as illustrated in FIG. 4 and FIG. 5, the variation in the throat a in the weld excluding regions (bead-start and bead-finish end portions 10) extending 15 mm from the bead-start end and from the bead-finish end of the weld bead 6 is preferably controlled to fall in a predetermined range.

Ratio of the Maximum Value of the Throat a to the Minimum Value of the Throat a (a Preferred Condition)

In cross sections perpendicular to the line (the weld line) parallel to the welding direction of the weld bead 6, the maximum value of the throat in the weld and the minimum value of the throat in the weld preferably satisfy the relationship $a_{max}/a_{min} \leq 1.5$ wherein $a_{max}$ is the maximum value (mm) and $a_{min}$ is the minimum value (mm) of the throat. The lower limit of $a_{max}/a_{min}$ is 1. Stress concentration can be relaxed by reducing the variation in the throat in the weld (that is, by reducing the ratio of $a_{max}$ to $a_{min}$). As a result, the arc welded joint that is obtained attains excellent joint strength. $a_{max}/a_{min}$ is preferably 1.01 or more, and more preferably 1.05 or more. $a_{max}/a_{min}$ is preferably 1.4 or less, and more preferably 1.3 or less.

The "maximum value $a_{max}$ of the throat" and the "minimum value $a_{min}$ of the throat" may be measured in the following manner, as described later in EXAMPLES. Specifically, the throat is measured in a region of the weld bead 6 excluding the bead-start and bead-finish end portions 10 (each 15 mm in length), with respect to randomly selected eight through-thickness cross sections of the weld bead 6 perpendicular to the weld line. Specifically, as illustrated in FIG. 5, the weld bead 6 is cut at randomly selected eight locations in the thickness direction perpendicular to the weld line, and the cross sections are subjected to Nital etching. Subsequently, the cross sections are photographed with an optical microscope (magnification: 10×) to determine the throat at the respective locations. The maximum value of the results is taken as the "maximum value $a_{max}$ (mm) of the throat", and the minimum value of the results is obtained as the "minimum value $a_{min}$ (mm) of the throat".

The steel sheets used in the arc welded joint of the disclosed embodiments are preferably high strength steel sheets having a tensile strength of 440 MPa or more. The upper limit of the tensile strength of the steel sheets is not particularly limited. From the point of view of application to automobile members, the tensile strength is preferably 1200 MPa or less.

Next, an embodiment will be described of the arc welding method for producing the arc welded joint of the disclosed embodiments. The arc welding is already described hereinabove with reference to FIG. 1, and thus the description thereof will be omitted here.

In the disclosed embodiments, the arc welding conditions are controlled as described below. This control is important in order to ensure that the throat a in the arc welded joint and the thickness t of the uppermost sheet will satisfy the above-described relationship, and the slag-covered area ratio $S_{RATIO}$ (%) will fall in the above-described range.

The arc welding of the disclosed embodiments involves a shielding gas including Ar gas and an oxidizing gas, and the oxidizing gas satisfies the relationship of the formula (2):

$$2\times[O_2]+[CO_2]\leq 5 \quad (2).$$

In the formula (2), $[O_2]$ is the vol % of $O_2$ in the shielding gas, and $[CO_2]$ is the vol % of $CO_2$ in the shielding gas.

When the arc welding is performed in reverse polarity, the welding wire 1 serves as the anode and the steel sheets 3 as the cathode (see FIG. 1). A welding voltage is applied from the welding wire 1 that is continuously fed to the steel sheets 3 through a central portion of the welding torch 2, and part of the shielding gas supplied from the inside of the welding torch 2 is ionized into plasma. Consequently, an arc 5 is formed between the welding wire 1 and the steel sheets 3. The remainder of the shielding gas (that is, the gas that is not ionized and flows from the welding torch 2 to the steel sheets 3) shields the arc 5, the molten metal 7, and the molten pool 8 from the outside air (see FIG. 2). In this manner, the remainder gas plays a role of preventing mixing of oxygen (and consequent slag formation) and mixing of nitrogen (and consequent blowhole formation).

The tip of the welding wire 1 is melted by the thermal energy of the arc 5 to form a molten metal 7, and the droplets are transported to the molten pool 8 by electromagnetic force or gravity. This process takes place while regularly repeating cycles in which the molten metal 7 is separate from the molten pool 8 (see FIG. 2(A)) and the molten metal 7 comes into contact with the molten pool 8 and is electrically short-circuited (see FIG. 2(B)). This phenomenon is caused to occur continuously while moving the welding wire 1 along the weld line. As a result, the molten pool 8 behind the weld line solidifies to form a weld bead 6.

The formation of slags is effectively prevented by specifying the oxidizing gas contained in the shielding gas and thereby reducing the amount of oxygen mixed into the molten metal 7 and the molten pool 8. As a result, chemical convertibility and electrodeposition coatability are enhanced, and the throat stably remains in the predetermined range even in a corrosive environment.

In order to obtain the above effects more effectively, the disclosed embodiments specify that the "shielding gas" in the welding conditions described above is a shielding gas including Ar gas and an oxidizing gas, and the oxidizing gas satisfies the relationship of the formula (2). If the left-side value in the formula (2) (that is, the value calculated by $(2\times[O_2]+[CO_2])$) exceeds 5, more oxygen is mixed into the molten metal 7 and the molten pool 8 and more slags attach to the weld bead surface. As a result, chemical convertibility and electrodeposition coatability are deteriorated. Thus, the left-side value in the formula (2) is limited to 5 or less. The value is preferably 3 or less. In the disclosed embodiments, the effects described above may be obtained even when the shielding gas is 100% Ar gas. That is, the left-side value in the formula (2) may be 0. Incidentally, the "100% Ar gas" means when the Ar purity is 99.99% or more.

In the disclosed embodiments, the arc welding conditions are controlled as described above, and thereby the arc welded joint can be obtained with the weld described hereinabove. In order to obtain the advantageous effects of the disclosed embodiments more effectively, the following welding conditions may be added to the above welding conditions.

The throat is effectively controlled in accordance with the sheet thickness through controlling of the amount of deposits from the welding wire per unit length in the welding process. As already described, the disclosed embodiments focus on the relationship between the welding speed and the wire feed speed.

Specifically, the welding speed $v_t$ (cm/min) and the wire feed speed $v_w$ (cm/min) are preferably controlled to satisfy the relationship $5\leq v_w/v_t\leq 35$. If the value of $v_w/v_t$ is less than 5, the wire feed is slow relative to the welding speed, and the amount of deposits from the welding wire per unit length is excessively small relative to the sheet thickness. As a result, the throat is small. If, on the other hand, the value of $v_w/v_t$ is more than 35, the wire feed is fast relative to the welding speed, and the amount of deposits from the welding wire per unit length is excessively large relative to the sheet thickness. As a result, the throat is large. The value of $v_w/v_t$ is more preferably 10 or more and is more preferably 30 or less.

As described hereinabove, arc welding with a reduced amount of an oxidizing gas in the shielding gas generates less slags. On the other hand, cathode spots move around so actively that the weld bead 6 may meander or may become wavy.

In order to eliminate this drawback, the arc welding of the disclosed embodiments is preferably performed in such a manner that the welding wire 1 and the steel sheets 3 are intermittently short-circuited, and the average value of the frequencies at which the short-circuits occur (hereinafter, written as the "short-circuit frequencies") and the maximum value of the cycles for which the short-circuits occur (hereinafter, written as the "short-circuit cycles") are controlled as follows. Specifically, the average value of the short-circuit frequencies (the average short-circuit frequency) $F_{AVE}$ (Hz) is preferably controlled to 20 to 300 Hz, and the maximum value of the short-circuit cycles (the maximum short-circuit cycle) $T_{CYC}$ (s) is preferably controlled to 1.5 s or less.

The reasons will be described below as to why the welding wire 1 and the steel sheets 3 are intermittently short-circuited in the arc welding and the short-circuit is controlled to satisfy the predetermined conditions.

The molten pool 8 is destabilized when the volume of the droplets coming from the tip of the welding wire 1 is too large or too small.

Specifically, if the average short-circuit frequency $F_{AVE}$ is less than 20 Hz, large droplets move to the molten pool 8, or the droplets irregularly exhibit a transfer mode other than the short-circuit transfer (such as, for example, streaming transfer). If, on the other hand, the average short-circuit frequency $F_{AVE}$ is more than 300 Hz, the droplets are small but the arc is re-ignited too often by the short-circuit. For these reasons, the molten pool 8 is disturbed in any of the above cases to make it difficult to eliminate meandering and waving of the weld bead. By controlling the average short-circuit frequency $F_{AVE}$ to 20 to 300 Hz, the volume of a droplet transported to the molten pool 8 by one short-circuit may be substantially equalized to the volume of a sphere having the same diameter as the welding wire 1. As a result, the droplet transfer can be stabilized and also the amounts of deposition can be uniformed. Thus, an appropriate throat can be obtained stably. For this reason, the average short-circuit frequency $F_{AVE}$ (Hz) of short-circuit in the disclosed embodiments is preferably controlled to 20 to 300 Hz.

In order to equalize the volumes of the droplets transported to the molten pool 8 per short-circuit and to enhance the uniformity of the weld bead, the average short-circuit frequency $F_{AVE}$ is more preferably 35 Hz or more, still more preferably 45 Hz or more, and even more preferably 50 Hz or more. If the average short-circuit frequency $F_{AVE}$ is high, small-volume droplets may scatter as a large amount of spatters during short-circuit and re-ignition. Thus, the average short-circuit frequency $F_{AVE}$ is more preferably 250 Hz or less, still more preferably 200 Hz or less, and even more preferably 190 Hz or less.

The "average short-circuit frequency $F_{AVE}$" indicates the average value of short-circuit frequencies in a welding pass performed to obtain the arc welded joint. The arc voltage is tracked during the welding pass with a measuring device (such as, for example, an oscilloscope) to count the number of the arc voltage becoming zero. The number is divided by the time (s) required for the welding to give the "average short-circuit frequency" (times/s=Hz).

If the maximum short-circuit cycle $T_{CYC}$ is more than 1.5 s, the droplet transfer is destabilized to result in unstable bead widths and unstable penetration depths. That is, a weld bead 6 having a good shape can be obtained by controlling the maximum short-circuit cycle $T_{CYC}$ to 1.5 s or less. Thus, in the disclosed embodiments, it is preferable that the maximum short-circuit cycle $T_{CYC}$ of short-circuit be controlled to 1.5 s or less.

The "maximum short-circuit cycle $T_{CYC}$" indicates the maximum value of the short-circuit cycles in a welding pass performed to obtain the arc welded joint. That is, the term means that each of the short-circuit cycles in the welding pass does not exceed 1.5 s.

In order to ensure that the average short-circuit frequency $F_{AVE}$ is 20 Hz or more, it is more preferable that the maximum short-circuit cycle $T_{CYC}$ be 1.0 s or less, still more preferably 0.2 s or less, and even more preferably 0.10 s or less. The maximum short-circuit cycle $T_{CYC}$ of short-circuit is appropriately such that the average short-circuit frequency $F_{AVE}$ is 300 Hz or less. Thus, the lower limit of the maximum short-circuit cycle $T_{CYC}$ is not particularly limited. The maximum short-circuit cycle $T_{CYC}$ is preferably 0.004 s or more, and more preferably 0.008 s or more.

The above control of the average short-circuit frequency $F_{AVE}$ and the maximum short-circuit cycle $T_{CYC}$ to fall in the predetermined ranges makes it possible to regularly stabilize the movement of droplets in the arc welding using a shielding gas that includes Ar shielding gas and a reduced amount of an oxidizing gas. As a result, slag formation can be suppressed while ensuring stable arc discharge. Thus, the weld bead 6 that can attain a slag-covered area ratio $S_{RATIO}$ within the above-described range is obtained.

For example, preferred ranges of the welding conditions are average welding current: 150 to 300 A, average arc voltage: 20 to 35 V, welding speed: 30 to 200 cm/min, Ar gas flow rate: 10 to 25 Liters/min, and distance between the contact tip and the workpieces (hereinafter, written as the "CTWD"): 5 to 30 mm.

In the disclosed embodiments, the average short-circuit frequency and the maximum short-circuit cycle may be controlled to fall in the above ranges in any manner without limitation.

Figure 6:
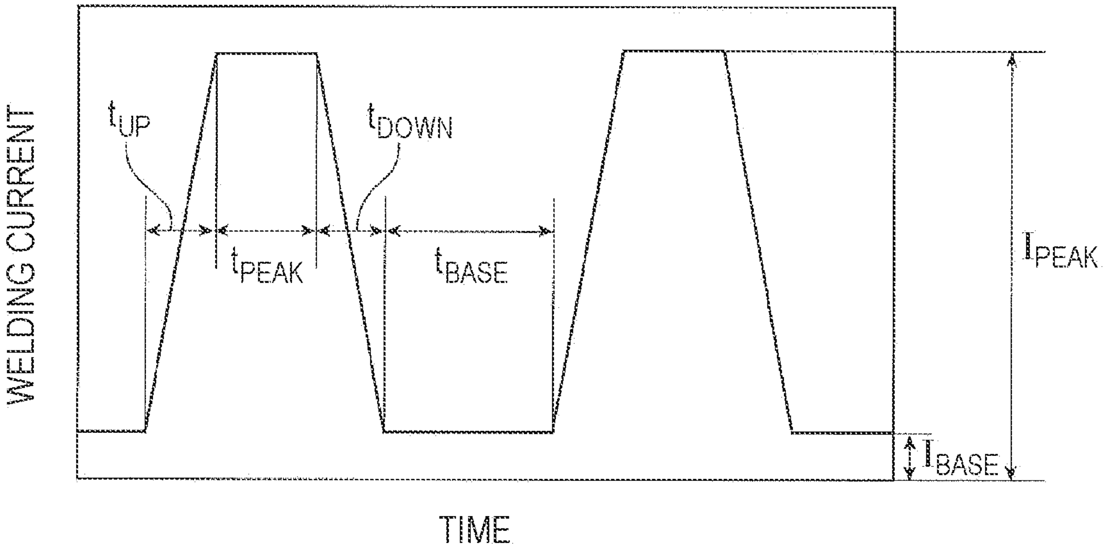
FIG. 6 is a graph illustrating an example of the waveform of a pulse current supplied as a welding current.

For example, it is preferable to control the current waveform by application of a pulse current as illustrated in FIG. 6. Specifically, control is made so that the value of X (A·s/m) calculated by the formula (3) will satisfy 50≤X≤250 wherein $I_{PEAK}$ is the peak current (A) of the pulse current, $I_{BASE}$ is the base current (A), $t_{PEAK}$ is the peak time (ms), $t_{UP}$ is the rise time (ms), $t_{DOWN}$ is the fall time (ms), and L is the CTWD (mm). In this manner, stable droplet transfer can be realized, and the weld bead 6 that has a throat a of the weld metal and a slag-covered area ratio $S_{RATIO}$ within the ranges described above can be obtained more effectively.

$$X=(I_{PEAK}\times t_{PEAK}/L)+(I_{PEAK}+I_{BASE})\times(t_{UP}+t_{DOWN})/(2\times L) \quad (3)$$

The formula (3) expresses the control of current waveform by application of a pulse current as illustrated in FIG. 6.

If the value of X (A·s/m) calculated by the formula (3) is too small, the arc 5 may sway and the droplet transfer may be destabilized. If, on the other hand, the value of X is too large, the welding wire 1 may be dipped into the molten pool 8, or droplets that have grown may be scattered during short-circuit to, for example, deteriorate the bead shape or to be attached as spatters. Thus, the value of X is preferably controlled to satisfy 50≤X≤250. The value of X is more preferably 60 or more, and still more preferably 80 or more. The value of X is more preferably 230 or less, and still more preferably 200 or less.

Incidentally, "s" in the unit of X (A·s/m) is seconds (sec), and "ms" in the unit of $t_{PEAK}$, $t_{UP}$, and $t_{DOWN}$ is milliseconds (=1/1000 sec).

If the value of the distance L between the steel sheets 3 and the contact tip is too small, the welding torch 2 is severely worn and the welding is destabilized. If the value of the distance L is too large, the arc 5 sways. Thus, the value of L in the formula (3) is preferably 5 to 30 mm. The value of L is more preferably 8 mm or more and is more preferably 20 mm or less. The value of L is still more preferably 10 mm or more and is still more preferably 18 mm or less.

If the value of $I_{PEAK}$ is too small, a sufficient heat input cannot be ensured, and the bead shape is deteriorated. If the value is too large, burn-through occurs or spatters are increased. Thus, the value of $I_{PEAK}$ in the formula (3) is preferably 250 to 600 A. $I_{PEAK}$ is more preferably 400 A or more and is more preferably 500 A or less.

If the value of $I_{BASE}$ is too small, the arc is destabilized. If the value is too large, burn-through occurs. Thus, the value of $I_{BASE}$ in the formula (3) is preferably 30 to 120 A. $I_{BASE}$ is more preferably 40 A or more. $I_{BASE}$ is more preferably 100 A or less, and still more preferably 80 A or less.

If the value of $t_{PEAK}$ is too small, a sufficient heat input cannot be ensured. If the value is too large, burn-through occurs. Thus, the value of $t_{PEAK}$ in the formula (3) is preferably 0.1 to 5.0 ms. $t_{PEAK}$ is more preferably 1.0 ms or more and is more preferably 4.0 ms or less. $t_{PEAK}$ is still more preferably 1.2 ms or more and is still more preferably 3.5 ms or less.

If $t_{UP}$ and $t_{DOWN}$ are too small, the arc sways. If the values are too large, the bead shape is deteriorated. Thus, the values of $t_{UP}$ and $t_{DOWN}$ in the formula (3) are preferably each 0.1 to 3.0 ms. $t_{UP}$ and $t_{DOWN}$ are more preferably each 0.5 ms or more and are more preferably each 2.5 ms or less, and are still more preferably each 0.8 ms or more and are still more preferably each 2.0 ms or less.

Although not used in the formula (3) for calculating the value of X, the base time of the pulse current may be written as $t_{BASE}$ (ms). If $t_{BASE}$ is too small, the droplets are too small. If the value is too large, the droplets are too big. In both cases, the welding is destabilized as a result. Thus, $t_{BASE}$ is preferably 0.1 to 10.0 ms. $t_{BASE}$ is more preferably 1.0 ms or more and is more preferably 8.0 ms or less. $t_{BASE}$ is still more preferably 1.5 ms or more and is still more preferably 6.0 ms or less.

In the disclosed embodiments, it is not necessary that one short-circuit occur in each cycle of the pulse current, and one short-circuit may be caused to occur in one pulse to several pulses. The pulse frequency of the pulse current is not particularly limited as long as one short-circuit can occur in one pulse to several pulses.

In the disclosed embodiments, the controlling of the pulse current intends (i) to promote stable growth of droplets while suppressing swaying of the arc by keeping the current low during the base time, and (ii) to promote short-circuit by pushing the droplet that has grown down into the molten pool, not detaching the grown droplet from the wire, by electromagnetic force and the shearing force of the Ar shielding gas during a period from the peak time to the fall time.

The arc welding method of the disclosed embodiments does not require a supply of oxygen or the addition of special elements. Thus, the process cost can be lowered by using, as the welding wire, a solid wire that is less expensive than a flux-cored wire. In the disclosed embodiments, the wire composition (the wire chemical composition) of the solid wire is not particularly limited.

For example, a suitable solid wire is a solid wire that contains C: 0.020 to 0.150 mass %, Si: 0.20 to 1.00 mass %, Mn: 0.50 to 2.50 mass %, P: 0.020 mass % or less, and S: 0.03 mass % or less. Such a wire composition, with appropriate control of the composition, can be applied to arc welding of a wide variety of steel types from mild steels to ultrahigh tensile strength steels. The diameter of the solid wire is preferably 0.4 mm to 2.0 mm.

The reasons will be described below as to why the above wire composition of the solid wire is preferable.

C: 0.020 to 0.150 Mass %

Carbon is an element that is necessary to ensure the strength of the weld metal, and lowers the viscosity of the molten metal to effectively enhance the fluidity. If, however, the C content is less than 0.020 mass %, the strength of the weld metal cannot be ensured. If, on the other hand, the C content exceeds 0.150 mass %, the toughness of the weld metal is lowered. Thus, the C content is preferably 0.020 to 0.150 mass %. The C content is more preferably 0.050 mass % or more and is more preferably 0.10 mass % or less.

Si: 0.20 to 1.00 Mass %

Silicon is an element that has a deoxidizing effect and, by being added in an appropriate amount, enhances the hardenability of the weld metal to contribute to enhancements in the toughness and the strength of the weld metal. In MIG welding, mixing of oxygen into the weld metal can be eliminated or reduced by the Ar shielding gas, and the deoxidizing action of Si is not particularly necessary. If, however, the Si content is less than 0.20 mass %, the droplets and the molten pool oscillate during the welding process to generate a large amount of spatters. If, on the other hand, the Si content exceeds 1.00 mass %, the toughness of the weld metal is lowered. Thus, the Si content is preferably 0.20 to 1.00 mass %. The Si content is more preferably 0.30 mass' or more and is more preferably 0.90 mass % or less.

Mn: 0.50 to 2.50 Mass %

Manganese is an element that has a deoxidizing effect similarly to Si and enhances mechanical properties of the weld metal. If, however, the Mn content is less than 0.50 mass %, a sufficient amount of Mn does not remain in the weld metal and sufficient strength and toughness cannot be obtained. If, on the other hand, the Mn content exceeds 2.50 mass %, the toughness of the weld metal is lowered. Thus, the Mn content is preferably 0.50 to 2.50 mass %. The Mn content is more preferably 0.80 mass % or more and is more preferably 1.80 mass or less.

P: 0.020 Mass % s or Less

Phosphorus is an element that is mixed as an impurity into steel during the steelmaking process and the casting process. This element lowers the hot cracking resistance of the weld metal and is preferably removed as much as possible. If, in particular, the P content exceeds 0.020 mass %, the hot cracking resistance of the weld metal is markedly lowered. Thus, the P content is preferably 0.020 mass % or less. The P content is more preferably 0.010 mass % or less. From the point of view of the hot cracking resistance of the weld metal, the lower limit of the P content is not particularly limited and may be 0 mass %. The P content is preferably 0.001 mass % or more.

S: 0.03 Mass % or Less

Sulfur is an impurity that is incidentally mixed into the steel wires. This element lowers the hot cracking resistance of the weld metal and is preferably removed as much as possible. If, in particular, the S content exceeds 0.03 mass %, hot cracking occurs easily in the weld metal. Thus, the S content is preferably 0.03 mass % or less. The S content is more preferably 0.015 mass % or less. From the point of view of the hot cracking resistance of the weld metal, the lower limit of the S content is not particularly limited and may be 0 mass %. The S content is preferably 0.001 mass % or more.

In addition to the above wire composition, the solid wire may appropriately contain one, or two or more selected from Ni, Cr, Ti, and Mo as needed.

Nickel is an element that increases the strength of the weld metal and enhances the weather resistance. However, the above effects cannot be obtained if the Ni content is less than 0.02 mass %. If, on the other hand, the Ni content exceeds 3.50 mass %, the toughness of the weld metal is lowered. Thus, when nickel is added, the Ni content is preferably 0.02 to 3.50 mass %.

Similar to nickel, chromium is an element that increases the strength of the weld metal and enhances the weather resistance. However, the above effects cannot be obtained if the Cr content is less than 0.01 mass %. If, on the other hand, the Cr content exceeds 1.50 mass %, the toughness of the weld metal is lowered. Thus, when chromium is added, the Cr content is preferably 0.01 to 1.50 mass %.

Titanium is an element that acts as a deoxidizing agent and enhances the strength and the toughness of the weld metal. Furthermore, titanium also has an effect of stabilizing the arc and reducing the amount of spatters. If, however, the Ti content exceeds 0.15 mass %, the droplets are coarsened during the welding process and large spatters are generated, and further the toughness of the weld metal is markedly lowered. Thus, when titanium is added, the Ti content is preferably 0.15 mass % or less.

Molybdenum is an element that enhances the strength of the weld metal. If the content thereof exceeds 0.8 mass %, the toughness of the weld metal is lowered. Thus, when molybdenum is added, the Mo content is preferably 0.8 mass % or less.

The balance of the wire composition of the solid wire is Fe and incidental impurities.

Examples of the incidental impurities in the wire composition include N and Cu. Nitrogen is an impurity that is incidentally mixed at the stage of making the steel material and the stage of producing the steel wires, and adversely affects the toughness of the weld metal. Thus, the N content is preferably lowered to 0.01 mass % or less. Copper is an impurity that is incidentally mixed into the steel wires. This element lowers the toughness of the weld metal. If, in particular, the Cu content exceeds 3.0 mass %, the toughness of the weld metal is markedly lowered. Thus, the Cu content is preferably 3.0 mass % or less.

As described hereinabove, the disclosed embodiments specify the throat in the weld of steel members in accordance with the sheet thickness to relax the stress concentration in the weld, and suppress rusting by reducing the coating weight of slags attached to the weld, thereby enhancing the joint strength of the weld even in a progressively corrosive environment. The success in reducing the coating weight of slags makes unlikely a change in shape even in a corrosive environment, thus allowing the throat to be maintained. Furthermore, according to the disclosed embodiments, members having the characteristics described above can be manufactured using high strength steel sheets having a tensile strength of, for example, 440 MPa or more (for example, 440 MPa, 590 MPa, and 980 MPa grade steel sheets). The use of such high strength steel sheets allows for thickness reduction of the members. The disclosed embodiments are suitably used for such members as automobile members. It is therefore preferable that the thickness of the high strength steel sheets be 0.8 to 4 mm.

Examples

EXAMPLES of the disclosed embodiments will be described below.

First, two steel sheets shown in Table 1 were subjected to lap fillet welding illustrated in FIG. 1, and an arc welded joint was fabricated. The welding conditions are shown in Table 2. The Ar gas flow rate was 15 Liters/min. The welding wires, indicated by the "Wire symbol" in Table 2, were solid wires that had a wire composition shown in Table 4 and had a welding wire diameter of 1.2 mm. Components that are not found in the "Welding wire chemical composition" in Table 4 are Fe and incidental impurities. The wire symbol "W1" shown in Table 4 contains 0.005 mass % N and 0.27 mass % Cu as incidental impurities in the wire composition.

The arc welded joints fabricated were subjected to alkali degreasing, surface conditioning, and zinc phosphate chemical conversion. Cationic electrodeposition coating was performed under conditions such that the film thickness at the flat portions of the base material except the weld was 15 μm. Subsequently, 60 cycles of the SAE J2334 corrosion test were performed.

The shape of the weld bead after the welding process was evaluated as follows.

[Slag-Covered Area Ratio $S_{RATIO}$]

The surface of a region of the weld bead 6 excluding the bead-start and bead-finish end portions 10 (each 15 mm in length) of the weld bead 6 was photographed from directly above (magnification: 5×). Based on the obtained photograph image, the projected areas from above of the weld bead and the slags were measured to calculate the bead toe surface area $S_{TOE}$ and the slag surface area $S_{SLAG}$, respectively. When the length of the weld bead 6 was less than 130 mm, the surface over the entire length excluding the bead-start and bead-finish end portions 10 was photographed. When the length of the weld bead 6 was 130 mm or more, the surface of a randomly selected region (100 mm in length) of the weld bead 6 excluding the bead-start and bead-finish end portions 10 was photographed. Slags with a total length of 0.5 mm or less were excluded from the calculation.

As illustrated in FIG. 4 and FIG. 5, the bead toe surface area $S_{TOE}$ (mm) was the surface area of the weld bead 6 in a region extending 2.0 mm from the bead toe 9 in the weld metal direction and also extending 2.0 mm from the bead toe 9 in the base material direction. Of this bead toe surface area $S_{TOE}$, the total of the areas of regions covered with the slags 11 was taken as the slag surface area $S_{SLAG}$(mm$^2$).

The slag-covered area ratio $S_{RATIO}$ was determined using the calculated values of the bead toe surface area $S_{TOE}$ and the slag surface area $S_{SLAG}$, and the formula (1) described hereinabove. Table 3 shows the obtained slag-covered area ratios $S_{RATIO}$.

[Throat in the Weld]

The throat in the weld was measured in a region (see FIG. 3) of the weld bead 6 excluding the bead-start and bead-finish end portions 10 (each 15 mm in length), with respect to randomly selected eight through-thickness cross sections of the weld bead perpendicular to the weld line. As illustrated in FIG. 5, the weld bead 6 was cut at randomly selected locations in the thickness direction perpendicular to the weld line, and the cross sections were subjected to Nital etching. Subsequently, the cross sections were photographed with an optical microscope (magnification: 10×) to determine the throat at the respective locations. Here, the results were averaged to give the "throat a (mm)". Of the throats a at the randomly selected eight locations measured by the above throat a measurement method, the maximum value was taken as the "maximum value $a_{max}$ (mm) of the throat a", and the minimum value was obtained as the "minimum value $a_{min}$ (mm) of the throat a". Table 3 shows the throats (a, $a_{max}$, and $a_{min}$) obtained.

"Joint strength" shown in Table 3 was evaluated as follows.

The joint tensile strength was measured in the following manner. First, the arc welded joint after the corrosion test was immersed into a submerge stripping agent to strip the electrodeposition coating film, and subsequently the corrosion products were removed in accordance with ISO 8407. Next, a test piece for tensile test described in JIS Z 2241 was obtained by machining. The test piece for tensile test thus fabricated was subjected to a tensile test at room temperature and a cross head speed of 10 mm/min, and the joint tensile strength was recorded. This value was taken as the post-corrosion tensile strength.

Furthermore, the base material tensile strength was measured in the following manner. A test piece for tensile test described in JIS Z 2241 was obtained by machining the base material steel sheet that had a size (for example, 200 mm×300 mm×thickness) enough to give a test piece for tensile test. The test piece for tensile test thus fabricated was subjected to a tensile test at room temperature and a cross head speed of 10 mm/min, and the tensile strength was recorded. This value was taken as the base material tensile strength.

Based on the values obtained above, the joint strength was evaluated according to the following criteria and was rated as A, B, or F. Rating "A" shown in Table 3 was given when "(post-corrosion joint tensile strength)/(base material tensile strength)≥0.70". Rating "B" was given when "0.70>(post-corrosion joint tensile strength)/(base material tensile strength)≤0.60". Rating was "F" when "(post-corrosion joint tensile strength)/(base material tensile strength)<0.60". Rating A was best, followed by the rating B. Ratings A and B were "acceptable", and rating F was "failed". The evaluation results are shown in Table 3. The values of "Strength ratio" in Table 3 are values of (post-corrosion joint tensile strength)/(base material tensile strength).

"Rusting prevention" shown in Table 3 was evaluated as follows.

In the welded joint after the accelerated corrosion test, the surface of a region of the weld bead 6 excluding the bead-start and bead-finish end portions 10 (each 15 mm in length) of the weld bead 6 was photographed from directly above (see FIG. 3). The average rust area per unit length (mm$^2$/10 mm) was calculated. The values obtained are shown in Table 3.

Here, the rusting prevention was evaluated according to the following criteria.

The post-corrosion antirust effect was evaluated as very good when the average rust area was larger than 95 (mm$^2$/10 mm) and 100 (mm$^2$/10 mm) or less. Furthermore, the post-corrosion antirust effect was evaluated as excellent when the average rust area was larger than 50 (mm$^2$/10 mm) and 95 (mm$^2$/10 mm) or less. Furthermore, the post-corrosion antirust effect was evaluated as superior when the average rust area was 50 (mm$^2$/10 mm) or less.

TABLE 1

| Steel sheet | Tensile strength (MPa) | Thickness (mm) |
|---|---|---|
| a | 440 | 2.6 |
| b | 590 | 2.6 |
| c | 980 | 2.6 |

TABLE 1-continued

| Steel sheet | Tensile strength (MPa) | Thickness (mm) |
|---|---|---|
| d | 980 | 1.0 |
| e | 980 | 3.2 |

TABLE 2

| | Welding conditions | | | | | | | | | |
|---|---|---|---|---|---|---|---|---|---|---|
| | Shielding gas | | | Average | | | Welding | | | |
| No. | Components | Left-side value in Formula (2) | Pulse | welding current (A) | Average arc voltage (V) | Pulse frequency (Hz) | speed $V_t$ (cm/min) | Steel sheets | CTWDL (mm) | Metal transfer mode |
| 1 | 100% Ar | 0 | Yes | 235 | 26 | 185 | 70 | c | 5 | Short-circuit |
| 2 | 100% AF | 0 | Yes | 245 | 25 | 176 | 70 | c | 15 | Short-circuit |
| 3 | Ar-3% $CO_2$ | 3 | Yes | 220 | 22 | 135 | 70 | c | 10 | Short-circuit |
| 4 | Ar-3% $CO_2$ | 3 | No | 214 | 20 | — | 50 | b | 25 | Not short-circuit |
| 5 | Ar-2% $O_2$ | 4 | No | 194 | 20 | — | 80 | c | 15 | Not short-circuit |
| 6 | 100% Ar | 0 | No | 188 | 21 | — | 80 | a | 15 | Not short-circuit |
| 7 | Ar-5% $CO_2$ | 5 | No | 187 | 19 | — | 100 | c | 15 | Not short-circuit |
| 8 | 100% Ar | 0 | Yes | 208 | 26 | 129 | 140 | b | 15 | Short-circuit |
| 9 | 100% Ar | 0 | Yes | 217 | 25 | 113 | 30 | c | 15 | Short-circuit |
| 10 | 100% Ar | 0 | Yes | 251 | 22 | 229 | 70 | c | 10 | Short-circuit |
| 11 | 100% Ar | 0 | Yes | 230 | 23 | 95 | 70 | b | 10 | Short-circuit |
| 12 | 100% Ar | 0 | Yes | 238 | 24 | 122 | 100 | c | 10 | Short-circuit |
| 13 | 100% Ar | 0 | Yes | 257 | 26 | 88 | 70 | c | 20 | Short-circuit |
| 14 | 100% Ar | 0 | Yes | 211 | 25 | 101 | 130 | d | 15 | Short-circuit |
| 15 | 100% Ar | 0 | Yes | 239 | 25 | 105 | 50 | e | 15 | Short-circuit |
| 16 | 100% Ar | 0 | Yes | 240 | 24 | 78 | 30 | a | 10 | Short-circuit |
| 17 | 100% Ar | 0 | Yes | 174 | 22 | 208 | 60 | a | 10 | Short-circuit |
| 18 | Ar-10% $CO_2$ | 10 | Yes | 289 | 21 | 74 | 30 | b | 20 | Short-circuit |
| 19 | Ar-6% $CO_2$ | 6 | Yes | 241 | 31 | 281 | 30 | c | 5 | Short-circuit |
| 20 | Ar-20% $CO_2$ | 20 | No | 163 | 19 | — | 80 | c | 15 | Not short-circuit |
| 21 | Ar-10% $CO_2$ | 10 | No | 225 | 20 | — | 20 | b | 15 | Not short-circuit |
| 22 | Ar-7% $CO_2$ | 7 | No | 165 | 18 | — | 190 | b | 15 | Not short-circuit |

| | Welding conditions | | | | | | | | | | | | |
|---|---|---|---|---|---|---|---|---|---|---|---|---|---|
| No. | Wire symbol | Wire feed speed $V_w$ (cm/min) | $F_{AVE}$ (Hz) | $T_{CVC}$ (s) | $V_w/V_t$ | $I_{PEAK}$ (A) | $I_{BASE}$ (A) | $t_{PEAK}$ (ms) | $t_{UP}$ (ms) | $t_{DOWN}$ (ms) | $I_{BASE}$ (ms) | X (A · s/m) | Remarks |
| 1 | W1 | 948 | 49 | 0.06 | 13.5 | 450 | 50 | 1.5 | 1.0 | 1.0 | 2.0 | 235 | EX. |
| 2 | W2 | 976 | 104 | 0.01 | 13.9 | 500 | 80 | 1.5 | 1.0 | 1.0 | 2.2 | 89 | EX. |
| 3 | W3 | 843 | 52 | 0.06 | 12.0 | 500 | 50 | 1.5 | 1.0 | 1.0 | 3.9 | 130 | EX. |
| 4 | W2 | 809 | — | — | 16.2 | — | — | — | — | — | — | — | EX. |
| 5 | W2 | 752 | — | — | 9.4 | — | — | — | — | — | — | — | EX. |
| 6 | W2 | 744 | — | — | 9.3 | — | — | — | — | — | — | — | EX. |
| 7 | W2 | 726 | — | — | 7.3 | — | — | — | — | — | — | — | EX. |
| 8 | W2 | 748 | 79 | 0.03 | 5.3 | 550 | 50 | 4.0 | 1.0 | 1.0 | 1.8 | 187 | EX. |
| 9 | W2 | 764 | 60 | 0.07 | 25.5 | 550 | 50 | 2.0 | 1.0 | 1.0 | 4.8 | 113 | EX. |
| 10 | W2 | 1008 | 291 | 0.005 | 14.4 | 450 | 50 | 0.5 | 1.0 | 1.0 | 1.9 | 73 | EX. |
| 11 | W2 | 936 | 216 | 0.005 | 13.43 | 450 | 50 | 2.0 | 3.0 | 3.0 | 2.5 | 240 | EX. |
| 12 | W2 | 1012 | 183 | 0.006 | 10.1 | 550 | 50 | 2.0 | 1.0 | 1.0 | 4.2 | 170 | EX. |
| 13 | W2 | 1036 | 23 | 0.35 | 14.8 | 450 | 50 | 1.5 | 1.0 | 1.0 | 7.9 | 59 | EX. |
| 14 | W2 | 752 | 79 | 0.03 | 5.8 | 400 | 50 | 1.5 | 1.0 | 1.0 | 6.4 | 70 | EX. |
| 15 | W2 | 964 | 90 | 0.02 | 19.3 | 500 | 80 | 2.0 | 1.5 | 1.5 | 5.0 | 125 | EX. |
| 16 | W1 | 1042 | 66 | 0.05 | 34.7 | 350 | 50 | 2.0 | 1.0 | 1.0 | 8.8 | 110 | EX. |
| 17 | W1 | 684 | 58 | 0.11 | 11.4 | 250 | 30 | 2.0 | 1.0 | 1.0 | 0.8 | 78 | EX. |
| 18 | W2 | 1146 | 19 | 0.14 | 38.2 | 300 | 30 | 1.5 | 1.0 | 1.0 | 10.0 | 39 | COMP. EX. |
| 19 | W2 | 976 | 304 | 0.001 | 32.5 | 450 | 50 | 0.5 | 0.5 | 0.5 | 2.1 | 95 | COMP. EX. |
| 20 | W1 | 619 | — | — | 7.7 | — | — | — | — | — | — | — | COMP. EX. |
| 21 | W1 | 855 | — | — | 42.8 | — | — | — | — | — | — | — | COMP. EX. |
| 22 | W3 | 674 | — | — | 3.5 | — | — | — | — | — | — | — | COMP. EX. |

Polarity = Direct current reverse polarity, Gas flow rate = 15 L/min

*1. $2 \times [O_2] + [CO_2] \leq 5$ . . . Formula (2)

*2. $X = (I_{PEAK} \times t_{PEAK}/L) + (I_{PEAK} + I_{BASE}) \times (t_{UP} + t_{DOWN})/(2 \times L)$ . . . Formula (3)

TABLE 3

| | Weld | | | | | Average | | | |
|---|---|---|---|---|---|---|---|---|---|
| | Weld bead | Throat | | | | rust area | | | |
| No. | $S_{RATIO}$ (%) | a (mm) | $a_{max}$ (mm) | $a_{min}$ (mm) | $a_{max}/a_{min}$ | ($mm^2$/10 mm) | Strength ratio | Rating | Remarks |
| 1 | 10 | 1.2 t | 1.3 t | 1.0 t | 1.30 | 24 | 0.88 | A | EX. |
| 2 | 13 | 1.2 t | 1.4 t | 1.1 t | 1.27 | 48 | 0.84 | A | EX. |
| 3 | 28 | 1.0 t | 1.1 t | 1.0 t | 1.10 | 38 | 0.77 | A | EX. |
| 4 | 32 | 1.4 t | 1.7 t | 1.1 t | 1.55 | 81 | 0.69 | B | EX. |
| 5 | 45 | 0.9 t | 1.3 t | 0.7 t | 1.86 | 85 | 0.62 | B | EX. |
| 6 | 17 | 0.9 t | 1.1 t | 0.5 t | 2.20 | 40 | 0.67 | B | EX. |
| 7 | 39 | 0.6 t | 0.9 t | 0.4 t | 2.25 | 74 | 0.63 | B | EX. |
| 8 | 16 | 0.8 t | 1.2 t | 0.6 t | 2.00 | 31 | 0.68 | B | EX. |
| 9 | 15 | 1.7 t | 1.9 t | 1.6 t | 1.19 | 20 | 0.71 | A | EX. |
| 10 | 17 | 1.3 t | 1.5 t | 1.1 t | 1.36 | 28 | 0.81 | A | EX. |
| 11 | 16 | 1.2 t | 1.5 t | 1.0 t | 1.50 | 21 | 0.77 | A | EX. |
| 12 | 11 | 1.0 t | 1.1 t | 0.8 t | 1.38 | 19 | 0.75 | A | EX. |
| 13 | 15 | 1.5 t | 1.6 t | 1.2 t | 1.33 | 33 | 0.80 | A | EX. |
| 14 | 21 | 0.7 t | 0.8 t | 0.5 t | 1.60 | 38 | 0.63 | B | EX. |
| 15 | 19 | 1.6 t | 1.6 t | 1.5 t | 1.07 | 34 | 0.77 | A | EX. |
| 16 | 20 | 1.8 t | 2.0 t | 1.3 t | 1.54 | 26 | 0.68 | B | EX. |
| 17 | 20 | 1.1 t | 1.3 t | 1.0 t | 1.30 | 37 | 0.75 | A | EX. |
| 18 | 57 | 2.0 t | 2.0 t | 1.8 t | 1.11 | 120 | 0.58 | F | COMP. EX. |
| 19 | 52 | 1.9 t | 2.0 t | 1.6 t | 1.25 | 101 | 0.55 | F | COMP. EX. |
| 20 | 64 | 0.81 | 1.3 t | 1.0 t | 1.30 | 126 | 0.49 | F | COMP. EX. |
| 21 | 55 | 2.1 t | 2.0 t | 1.8 t | 1.11 | 104 | 0.43 | F | COMP. EX. |
| 22 | 51 | 0.4 t | 0.5 t | 0.3 t | 1.67 | 107 | 0.52 | F | COMP. EX. |

*1. $S_{RATIO} = 100 \times S_{SLAG}/S_{TOE}$
*Rating:
A (Post-corrosion joint tensile strength)/(Base material tensile strength) ≥ 0.70
B 0.70 > (Post-corrosion joint tensile strength)/(Base material tensile strength) ≥ 0.60
F (Post-corrosion joint tensile strength)/(Base material tensile strength) < 0.60

TABLE 4

| Wire | Welding wire chemical composition (mass %) | | | | | | | |
|---|---|---|---|---|---|---|---|---|
| symbol | C | Si | Mn | P | S | Ni | Cr | Ti | Mo |
| W1 | 0.070 | 0.40 | 1.67 | 0.007 | 0.005 | — | — | — | — |
| W2 | 0.068 | 0.57 | 1.06 | 0.006 | 0.006 | 0.030 | — | — | 0.600 |
| W3 | 0.060 | 0.92 | 1.40 | 0.007 | 0.014 | — | 0.025 | 0.001 | — |

As it is clear from Table 2 and Table 3, welding Nos. 1 to 17 representing EXAMPLES satisfied 0.5×t≤a≤1.8×t and an $S_{RATIO}$ of 50% or less. As a result, the arc welded joints that were obtained prevented rusting and had excellent joint strength.

Among these EXAMPLES, welding Nos. 1 to 3, 9 to 13, 15, and 17 resulted in a ratio ($a_{max}/a_{min}$) of the maximum value $a_{max}$ to the minimum value $a_{min}$ of the throat of 1.5 or less. As a result, the stress concentration was relaxed, and the arc welded joints that were obtained had particularly excellent joint strength.

Furthermore, the results of EXAMPLES have confirmed that the advantageous effects described hereinabove can be obtained using any of welding wires for ultrahigh tensile strength steels (wire symbols W1 and W2 in Table 4) and welding wires for mild steels (wire symbol W3 in Table 4).

In contrast, COMPARATIVE EXAMPLES resulted in a<0.5×t or a>1.8×t, or an $S_{RATIO}$ of more than 50%, and consequently the joint tensile strength was significantly lowered by the progress of corrosion.

Incidentally, the graph in FIG. 7 illustrates relationships between the throat in the weld and the slag-covered area ratio, and the ratio of the joint tensile strength to the base material tensile strength (strength ratio) in EXAMPLES. As illustrated in FIG. 7, the joint strength was successfully enhanced by appropriately controlling the throat and reducing the amount of an oxidizing gas in the shielding gas to reduce the slag-covered area ratio.

The invention claimed is:

1. An arc welded joint having a weld formed by arc welding of an overlap of at least two steel sheets, wherein a throat in the weld and a sheet that is uppermost among the steel sheets satisfy the following relationship:

$$0.5\times t \leq a \leq 1.8\times t$$

where a is the throat (mm) and t is a thickness (mm) of the uppermost sheet, and in a region extending 2.0 mm from a bead toe of the weld in a weld metal direction and extending 2.0 mm from the bead toe in a base material direction, a slag-covered area ratio $S_{RATIO}$ (%) represented by formula (1) is 50% or less:

$$S_{RATIO}=100\times S_{SLAG}/S_{TOE} \quad (1)$$

where $S_{TOE}$ is a bead toe surface area ($mm^2$) of a weld bead in the region, and $S_{SLAG}$ is part of the bead toe surface area $S_{TOE}$ and is a slag surface area ($mm^2$) of a region covered with a slag.

2. The arc welded joint according to claim 1, wherein the throat in the weld excludes bead-start and bead-finish end portions of the weld bead, and the throat has a maximum value and a minimum value satisfying the following relationship:

$$a_{max}/a_{min} \leq 1.5$$

where $a_{max}$ is a maximum value (mm) of the throat and $a_{min}$ is a minimum value (mm) of the throat.

3. An arc welding method for obtaining the arc welded joint according to claim 2, the method comprising:

forming the weld by arc welding of the overlap of the at least two steel sheets while using a shielding gas including Ar gas and an oxidizing gas, the oxidizing gas satisfying the relationship of formula (2):

$$2\times[O_2]+[CO_2]\leq 5 \quad (2)$$

where $[O_2]$ is a vol % of $O_2$ in the shielding gas, and $[CO_2]$ is a vol % of $CO_2$ in the shielding gas.

4. The arc welding method according to claim 3, wherein the arc welding is performed at a welding speed and a wire feed speed satisfying the following relationship:

$$5\leq v_w/v_t\leq 35$$

where $v_t$ is the welding speed (cm/min) and $v_w$ is the wire feed speed (cm/min).

5. The arc welding method according to claim 4, wherein the steel sheets and a welding wire are intermittently short-circuited during the arc welding, and an average short-circuit frequency $F_{AVE}$ (Hz) during the short-circuit is in a range of 20 to 300 Hz and a maximum short-circuit cycle $T_{CYC}$ (s) during the short-circuit is 1.5 s or less.

6. The arc welding method according to claim 5, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

7. The arc welding method according to claim 4, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

8. The arc welding method according to claim 3, wherein the steel sheets and a welding wire are intermittently short-circuited during the arc welding, and an average short-circuit frequency $F_{AVE}$ (Hz) during the short-circuit is in a range of 20 to 300 Hz and a maximum short-circuit cycle $T_{CYC}$ (s) during the short-circuit is 1.5 s or less.

9. The arc welding method according to claim 8, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

10. The arc welding method according to claim 3, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

11. An arc welding method for obtaining the arc welded joint according to claim 1, the method comprising:

forming the weld by arc welding of the overlap of the at least two steel sheets while using a shielding gas including Ar gas and an oxidizing gas, the oxidizing gas satisfying the relationship of formula (2):

$$2\times[O_2]+[CO_2]\leq 5 \quad (2)$$

where $[O_2]$ is a vol % of $O_2$ in the shielding gas, and $[CO_2]$ is a vol % of $CO_2$ in the shielding gas.

12. The arc welding method according to claim 11, wherein the arc welding is performed at a welding speed and a wire feed speed satisfying the following relationship:

$$5\leq v_w/v_t\leq 35$$

where $v_t$ is the welding speed (cm/min) and $v_w$ is the wire feed speed (cm/min).

13. The arc welding method according to claim 12, wherein the steel sheets and a welding wire are intermittently short-circuited during the arc welding, and an average short-circuit frequency $F_{AVE}$ (Hz) during the short-circuit is in a range of 20 to 300 Hz and a maximum short-circuit cycle $T_{CYC}$ (s) during the short-circuit is 1.5 s or less.

14. The arc welding method according to claim 13, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

15. The arc welding method according to claim 12, wherein the arc welding uses a solid wire as a welding wire, the arc welding uses a pulse current as a welding current, and a value of X (A·s/m) represented by formula (3) satisfies:

$$50\leq X\leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

16. The arc welding method according to claim 11, wherein the steel sheets and a welding wire are intermittently short-circuited during the arc welding, and an average short-circuit frequency $F_{AVE}$ (Hz) during the short-circuit is in a range of 20 to 300 Hz and a maximum short-circuit cycle $T_{CYC}$ (s) during the short-circuit is 1.5 s or less.

17. The arc welding method according to claim 16, wherein the arc welding uses a solid wire as a welding wire, the arc welding uses a pulse current as a welding current, and a value of X (A·s/m) represented by formula (3) satisfies:

$$50 \leq X \leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

18. The arc welding method according to claim 11, wherein the arc welding uses a solid wire as a welding wire, the arc welding uses a pulse current as a welding current, and a value of X(A·s/m) represented by formula (3) satisfies;

$$50 \leq X \leq 250$$

$$X=(I_{PEAK}\times t_{PEAK}/L)+(I_{PEAK}+I_{BASE})\times(t_{UP}+t_{DOWN})/(2\times L) \quad (3)$$

where $I_{PEAK}$ is a peak current (A) of the pulse current, $I_{BASE}$ is a base current (A), $t_{PEAK}$ is a peak time (ms), $t_{UP}$ is a rise time (ms), $t_{DOWN}$ is a fall time (ms), and L is a distance (mm) between the steel sheets and a contact tip.

* * * * *